United States Patent
Klendworth et al.

(10) Patent No.: US 6,630,544 B1
(45) Date of Patent: Oct. 7, 2003

(54) PROPYLENE POLYMERIZATION PROCESS WITH ENHANCED CATALYST ACTIVITY

(75) Inventors: Douglas D. Klendworth, West Chester, OH (US); Mark K. Reinking, Mason, OH (US); Edward D. Kist, Cincinnati, OH (US); Karen E. Meyer, Cincinnati, OH (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 10/125,757

(22) Filed: Apr. 18, 2002

(51) Int. Cl.$^7$ .................................................. C08F 4/42
(52) U.S. Cl. ................. 526/125.1; 526/351; 526/125.3; 526/123.1; 526/124.1; 502/103; 502/115; 502/132
(58) Field of Search .............................. 526/351, 125.3, 526/125.1, 123.1, 124.1; 502/103, 115, 132

(56) References Cited

U.S. PATENT DOCUMENTS

| | | | |
|---|---|---|---|
| 4,124,532 A | 11/1978 | Giannini et al. | 252/429 B |
| 4,173,547 A * | 11/1979 | Graff | 252/429 B |
| 4,302,565 A | 11/1981 | Goeke et al. | 526/88 |
| 4,302,566 A | 11/1981 | Karol et al. | 526/125 |
| 4,483,938 A | 11/1984 | Rees | 502/113 |
| 4,732,882 A | 3/1988 | Allen et al. | 502/104 |
| 4,833,111 A | 5/1989 | Nowlin | 502/107 |
| 6,187,866 B1 * | 2/2001 | Jorgensen et al. | 525/197 |

FOREIGN PATENT DOCUMENTS

EP      0 222 504 A1    5/1987

OTHER PUBLICATIONS

Samson, et al., *AIChE Journal*, vol. 45(#7) pp. 1548–1558 (1999) "Gas–Phase Polymerization of Propylene With A Highly Active Ziegler–Natta Catalyst."

* cited by examiner

*Primary Examiner*—Ling-Siu Choi
(74) *Attorney, Agent, or Firm*—John Tyrell; Jonathan L. Schuchardt

(57) ABSTRACT

A process for polymerizing propylene is disclosed. The process involves charging propylene and about 90 to 99% of an organoaluminum cocatalyst to a reactor and heating this mixture to at least about 50° C. This is followed by addition of a premix of 1 to 10% of the organoaluminum cocatalyst with a magnesium halide-supported Ziegler-Natta catalyst. The temperature of the reaction mixture is maintained to produce a propylene polymer. The process gives improved catalyst activity.

18 Claims, No Drawings

PROPYLENE POLYMERIZATION PROCESS WITH ENHANCED CATALYST ACTIVITY

FIELD OF THE INVENTION

This invention relates to a polymerization process for propylene. In particular, the invention relates to premixing a magnesium halide-supported Ziegler-Natta catalyst with a portion of an organoaluminum cocatalyst prior to polymerization.

BACKGROUND OF THE INVENTION

Ziegler-Natta catalysts, by which we mean a transition metal compound that incorporates a Group 4–8 transition metal, preferably a Group 4–6 transition metal, and one or more ligands that satisfy the valence of the metal are known to effectively promote the high yield polymerization of olefins possessing commercially desirable characteristics. However, the use of conventional Ziegler-Natta catalysts is subject to important limitations. Thus, new and improved catalysts are continually being sought and developed.

It is known that Ziegler-Natta catalysts can be supported on magnesium halides. U.S. Pat. No. 4,124,532 discloses the polymerization of ethylene and propylene with high activity catalysts. These catalysts comprise complexes which may contain magnesium and titanium. These complexes are prepared by reacting the halide $MX_2$ (where M may be Mg) with a compound M'Y (where M' may be Ti and Y is one or more halogens or an organic radicals) in an electron donor compound. These complexes are then isolated by either crystallization, by evaporation of the solvent or by precipitation. Polymerization is carried out with these complexes and an alkyl aluminum compound.

U.S. Pat. No. 4,173,547 to Graff discloses contacting a carrier with an organoaluminum halide and a dialkylmagnesium compound and then contacting the treated carrier with an organotitanium compound.

U.S. Pat. No. 4,302,565 to Goeke et al. and U.S. Pat. No. 4,302,566 to Karol et al. disclose catalyst systems for producing ethylene copolymers provided by a "precursor composition" which is the solid reaction product of magnesium chloride and titanium tetrachloride. This "precursor composition" is activated with an organoaluminum compound. They set forth a continuous process for ethylene copolymer production employing a gas phase fluidized bed vertical tubular reactor. A catalyst system is provided by a "precursor composition" which is the solid reaction product of magnesium chloride and titanium tetrachloride. This "precursor composition" is activated with an organoaluminum compound. Two methods are disclosed. One is by dry blending which has the disadvantage of handling a pyrophoric solid. The other activates in a hydrocarbon slurry, the hydrocarbon solvent is removed by drying and the partially activated precursor composition is fed to the polymerization reactor where the activation is completed with additional activator compound which can be the same or a different compound. In both methods, a catalyst preparation procedure separate from the polymerization is needed. This results in extra cost and complexity.

U.S. Pat. No. 4,732,882 to Allen et al. teaches a supported organomagnesium compound which is contacted with a transition metal compound and then with trimethylaluminum. Allen teaches that trimethylaluminum is superior to other alkyl aluminum compounds, but does not recognize the benefit of premixing a portion of the alkyl aluminum. In fact, Allen teaches that the method of combining trimethylaluminum with the catalyst precursor is not critical.

U.S. Pat. No. 4,833,111 to Nowlin contacts an alcohol with a slurry of a dialkylmagnesium compound and a support and then treats the resultant slurry with a transition metal compound. This resultant slurry is contacted with a halogenated alkylaluminum compound and then that product is activated with trimethylaluminum. While Nowlin teaches improved activity due to the pretreatment with the halogenated alkyl aluminum compound he does this by first reacting the slurry of the transition metal compound with solvent, then removing the solvent under reduced pressure and then treating the catalyst precursor with trimethylaluminum. Nowlin's process is complicated, involves several steps, and requires specific and different aluminum compounds.

U.S. Pat. No. 6,187,866 provides for the in-situ blending of polymers by contacting ethylene and one or more comonomers in two or more fluidized bed reactors connected in series under polymerization conditions with a catalyst system. The catalyst system is based upon a magnesium/titanium based precursor containing an electron donor which is treated with a precursor activator to influence the melt flow ratio of the polymer blend and then with a hydrocarbyl aluminum cocatalyst to complete the activation. By this process, they control the melt flow ratio of the blend or the bulk density of the blend. To activate the catalyst slurry, they treat with a first alkyl aluminum compound for 1–4 hours and then with a second alkyl aluminum compound for another 1–4 hours followed by complete activation in the polymerization reactor. The process is complicated and limited to the in situ blending of polymers.

Despite the importance of olefin polymerizations and the considerable research that has been done on various catalyst systems, there remains a need to improve the activity of the catalyst. This can be important from a cost view since the catalyst is typically one of the more costly ingredients. Similarly, the equipment for catalyst handling can add to the cost. Any improvement in catalyst activity decreases these costs. However, even more important is that the residual metal in the polymer is reduced. High levels of residual metal can have a deleterious effect on polymer properties such as color and aging. It is therefore important to keep the residual metals as low as possible. Any improvement in catalyst activity lowers the residual metals in the polymer.

SUMMARY OF THE INVENTION

The invention is a process for making polypropylene. A magnesium halide-supported Ziegler-Natta catalyst is premixed with 1 to 10% of an organoaluminum cocatalyst. This premix is then added to a heated mixture containing propylene and 90 to 99% of the organoaluminum cocatalyst. Temperature is maintained for the reaction mixture to produce polypropylene.

The process of the invention is easy to practice and affords enhanced catalyst activity. Since the catalyst is not removed from the final polymer, an increase in activity results in a polymer with lower residual metals. The process is robust and gives an improvement in activity for copolymers of propylene as well as the homopolymer. It is effective in the presence of molecular weight regulators and modifiers which can be used in propylene polymerizations.

DETAILED DESCRIPTION OF THE INVENTION

In the first step of the process of the invention, propylene is mixed with from about 90 to 99% of the organoaluminum cocatalyst.

The organoaluminum cocatalyst is an alkyl aluminum or an alkyl aluminum halide. Preferred alkyl aluminums include trialkyl or triaryl aluminum compounds, which preferably have the formula $AlR_3$ where each R is a $C_1$–$C_{30}$ hydrocarbyl. Particularly preferred alkyl aluminums are trimethylaluminum, triethylaluminum, tri-n-propylaluminum triisopropyl-aluminum, tri-n-butylaluminum, triisobutylaluminum, and tri-n-hexyl-aluminum. Suitable alkyl aluminum halides include dialkyl aluminum halide and alkyl aluminum dihalide compounds, which preferably have the formula $AlR_2X$ or $AlRX_2$ where X is Cl, Br, or I.

Exemplary alkyl aluminum halides are dimethylaluminum chloride, methylaluminum dichloride, diethylaluminum chloride, ethylaluminum dichloride, diisobutylaluminum chloride, isobutylaluminum dichloride, methylaluminum sesquichloride, ethylaluminum sesquichloride, and isobutylaluminum sesquichloride.

Preferably, organosilane modifiers are used in the polymerization. These help to maintain and control the stereoregularity of the polymer. They can also offer certain improvements such as an improved sensitivity to hydrogen as a means of controlling molecular weight. Preferred organosilane modifiers are alkyl alkoxysilanes which have the formula $R_ySi(OR)_{4-y}$ where R is as previously described and y is an integer from 1 to 3. More preferably, the organosilane modifiers are dialkyl dialkoxy silanes. Exemplary dialkyl dialkoxysilanes are diisopropyldimethoxysilane, isobutyl-isopropyldimethoxysilane, cyclohexylmethyidimethoxysilane, dimethyldimethoxysilane, dimethyldiethoxysilane and dicyclopentyldimethoxysilane.

If a copolymer of propylene is desired, an olefin comonomer is added with the propylene. Suitable olefin comonomers are $C_2$–$C_{20}$ α-olefins, such as ethylene, 1-butene, 1-hexene, 1-octene and mixtures thereof. Preferred olefin comonomers are ethylene, and mixtures thereof with α-olefins such as 1-butene, 1-hexene and 1-octene.

Optionally, hydrogen is added to regulate the molecular weight. Generally, the greater the level of hydrogen added, the lower the molecular weight.

In the second step, the propylene/cocatalyst mixture is heated to at least about 50° C. Preferably, the propylene/cocatalyst mixture is heated to about 60° C. to about 90° C.

In the third step, the remaining 1 to 10% of the organoaluminum cocatalyst is premixed with a magnesium halide-supported Ziegler-Natta catalyst and this premix is added to the heated propylene/cocatalyst mixture. The cocatalyst is an organoaluminum cocatalyst as described above for the first step. While it is possible to use one organoaluminum cocatalyst for step 1 and a different organoaluminum cocatalyst for premixing with the Ziegler-Natta catalyst, typically, for simplicity, the same organoaluminum cocatalyst is used in both steps. The premixture time need not be an extended time and can be just a matter of seconds. For a continuous process, the premixture can be done in the process stream by continuous addition of organoaluminum cocatalyst to the process stream containing the magnesium halide-supported Ziegler-Natta catalyst feed prior to entry into the reactor. In other words, the premixing can be done in situ as the combined streams are flowing to the reactor. This simplifies the process and avoids any potential issues with shelf life of the alkylated catalyst.

Catalysts useful in this invention are Ziegler-Natta catalysts supported on magnesium chloride, magnesium bromide or magnesium iodide. Preferably, anhydrous magnesium chloride is used. The Ziegler-Natta catalyst is admixed with the magnesium halide. By "Ziegler-Natta catalyst," we mean a transition metal compound that incorporates a Group 4–8 transition metal, preferably a Group 4–6 transition metal, and one or more ligands that satisfy the valence of the metal. The ligands are preferably halide, alkoxy, hydroxy, oxo, alkyl, and combinations thereof. Preferred Ziegler-Natta catalysts incorporate Ti, V, or Cr, most preferably Ti. Preferred Ziegler-Natta catalysts also have high thermal stability. They include titanium halides, titanium alkoxides, vanadium halides, and mixtures thereof, especially, $TiCl_3$, $TiCl_4$, mixtures of $VOCl_3$ with $TiCl_4$, and mixtures of $VCl_4$ with $TiCl_4$. Other suitable Ziegler-Natta catalysts appear in U.S. Pat. No. 4,483,938, the teachings of which are incorporated herein by reference, and in Eur. Pat. 222,504. A particularly preferable admixture is $TiCl_4$ supported on $MgCl_2$.

Preferably, the magnesium halide-supported Ziegler-Natta catalysts also contain a donor. These donors are Lewis bases. Suitable electron donor compounds include alkyl esters of aliphatic and aromatic carboxylic acids, aliphatic ethers, cyclic ethers and aliphatic ketones. The use of electron donors appears in U.S. Pat. No. 4,302,565, the teachings of which are incorporated herein by reference. Preferred donors are alkyl esters of aromatic carboxylic acids.

Optionally, the magnesium halide-supported catalysts are further supported on an oxide such as silica or alumina to provide a high surface area, inert support upon which to distribute the active ingredients and obtain good particle morphology.

While not wanting to be bound by theory, we believe that in this third step of the process of the invention, the remaining 1 to 10% of the organoaluminum cocatalyst prealkylates the catalyst under controlled conditions, thereby improving the catalyst activity. Preferably, this premixing is done at or below 40° C., more preferably between about −20° C. to about 20° C.

Optionally, the premixing is done in the presence of a portion of the propylene to be used or in an inert hydrocarbon solvent to facilitate mixing and handling.

The premix of the remaining 1 to 10% of the organoaluminum cocatalyst and supported Ziegler-Natta catalyst is added to the reactor mixture, which has been preheated to a temperature suitable for polymerization. This temperature is at least about 50° C. and preferably from about 60° C. to about 90° C. The temperature of the reaction mixture is maintained to produce polypropylene. Preferably, the polymerization is performed under pressure. During the polymerization, the pressure can be maintained by continuously feeding propylene, comonomer, hydrogen or a mixture of these depending upon the desired polymer properties.

A variety of types of polymerization processes can be used. Preferably, the process is practiced in the liquid phase, which can include slurry, suspension or bulk processes or a combination of these. High-pressure fluid phase or gas phase techniques can also be used. The process of the invention is particularly valuable for solution and slurry processes.

The following examples merely illustrate the invention. Those skilled in the art will recognize many variations that are within the spirit of the invention and scope of the claims.

EXAMPLE 1

Propylene Homopolymerization

In a dry box, 0.015 g of a polypropylene catalyst, THC-JA (a $TiCl_4$ supported on $MgCl_2$ type catalyst available from Toho Chemical Company) was premixed at room temperature with 0.1 mL of a 25 percent by weight solution of triethylaluminum in heptane. This catalyst premixture was added to one leg of a stainless steel catalyst injector. To the second leg of the catalyst injector was added 1.4 mL of a 25 percent by weight solution of triethylaluminum in heptane and 1.5 mL of 0.1M cyclohexylmethyldimethoxysilane in heptane. A 2-L polymerization reactor was pressure purged with dry nitrogen three times. After completely venting the reactor, the contents of the second catalyst injector leg were flushed into the reactor with 800 mL of liquid propylene. Hydrogen (100 delta psig on a 300-mL vessel) was added to the reactor. The reactor was heated to 65° C. and the catalyst premixture flushed into the reactor from the first injector leg with 200 mL of liquid propylene. The reactor was heated to 70° C. and the polymerization allowed to continue for 1 hour after which time the reactor was vented and the polymer removed. From the weight of the polymer, the activity was calculated to be 26,800 g polypropylene per gram of catalyst per hour.

Comparative Example 2
Propylene Homopolymerization

This example shows that without the premixture step of the invention, the catalyst activity is greatly reduced.

The polymerization process of Example 1 was generally followed except that none of the triethylaluminum solution was premixed with the catalyst and the entire 1.5 mL of a 25 percent by weight solution of triethylaluminum in heptane was added directly to the reactor. The activity was calculated to be 5,500 g polypropylene per gram of catalyst per hour.

EXAMPLE 3
Propylene Copolymerization

The polymerization process of Example 1 was generally followed except that the reactor was heated to 55° C. prior to the addition of the catalyst premixture, and then after addition of the catalyst premixture, the reactor was heated to 60° C. and ethylene added to give an increase of 10 psig pressure on the reactor. Rather than operating the reactor in a semi-batch mode with the ethylene being added continuously upon demand, the copolymerization was conducted in a pseudo-batch mode with the delta 10 psig of ethylene being replenished every ten minutes during the 1 hour reaction. Thus, once the delta 10 psig of ethylene was established on the reactor, the ethylene feed valve was closed until the allotted ten minutes had elapsed. From the weight of the copolymer, the activity was calculated to be 22,200 g copolymer per gram catalyst per hour.

Comparative Example 4
Propylene Copolymerization

This example shows that without the premixture step of the invention, the catalyst activity in the copolymerization is greatly reduced.

The copolymerization process of Example 3 was generally followed except that none of the triethylaluminum solution was premixed with the catalyst and the entire 1.5 mL of a 25 percent by weight solution of triethylaluminum in heptane was added directly to the reactor. The activity was calculated to be 300 g polymer per gram catalyst per hour.

EXAMPLE 5
Propylene Homopolymerization

A 2-L polymerization reactor was pressure purged with dry nitrogen three times. After completely venting the reactor, 1.9 mL of a 25 percent by weight solution of triethylaluminum in heptane and 2.0 mL of 0.1M cyclohexylmethyldimethoxysilane in heptane were flushed into the reactor with 800 mL of liquid propylene. Hydrogen (100 delta psig on a 300-mL vessel) was added to the reactor. The reactor was heated to 65° C. Then 0.007 g of a polypropylene catalyst, Toho 043 (a $TiCl_4$ supported on $MgCl_2$ type catalyst available from Toho Chemical Company) was diluted, for ease of handling, by mixing with $MgCl_2$ in a 1:3 ratio to give a total weight of 0.028 g of solid. This solid was premixed at room temperature with 0.1 mL of a 25 percent by weight solution of triethylaluminum in heptane and was flushed into the reactor with 200 mL of liquid propylene. The reactor was heated to 70° C. and the polymerization allowed to continue for 1 hour after which time the reactor was vented and the polymer removed. From the weight of the polymer, the activity was calculated to be 43,000 g polymer per gram catalyst per hour.

Comparative Example 6
Propylene Homopolymerization

This example shows that without the premixture step of the invention, the catalyst activity is greatly reduced.

The polymerization process of Example 5 was generally followed except that none of the triethylaluminum solution was premixed with the catalyst and the entire 2.0 mL of a 25 percent by weight solution of triethylaluminum in heptane was added directly to the reactor. The activity was calculated to be 17,500 g polymer per gram catalyst per hour.

Examples 7–10 and Comparative Examples 11–14
Propylene Homopolymerizations

These examples were run with polypropylene catalysts, CS-1 and CS-2, both $TiCl_4$ supported on $MgCl_2$ type catalysts available from Xiang Yang Chemical Company. CS-1 has flake morphology and CS-2 has spherical morphology. The polymerization process of Example 5 was generally followed for all the examples except that for Comparative Examples 11–14, none of the triethylaluminum solution was premixed with the catalyst and the entire 2.0 mL of a 25 percent by weight solution of triethylaluminum in heptane was added directly to the reactor. The organosilane modifier was varied in Examples 8 and 10 and in Comparative Examples 12 and 14. The results are listed in Table 1. These examples show that the improvement in activity is also seen with different catalysts and modifiers.

TABLE 1

Propylene Polymerizations

| EXAMPLE | Catalyst | Organosilane Modifier | Activity |
|---|---|---|---|
| 7 | CS-1 | cyclohexylmethyldimethoxysilane | 28,800 |
| 8 | CS-1 | dicyclopentyldimethoxysilane | 22,700 |
| 9 | CS-2 | cyclohexylmethyldimethoxysilane | 28,800 |
| 10 | CS-2 | dicyclopentyldimethoxysilane | 30,400 |
| Comparative 11 | CS-1 | cyclohexylmethyldimethoxysilane | 16,100 |
| Comparative 12 | CS-1 | dicyclopentyldimethoxysilane | 19,100 |
| Comparative 13 | CS-2 | cyclohexylmethyldimethoxysilane | 16,100 |
| Comparative 14 | CS-2 | dicyclopentyldimethoxysilane | 20,300 |

Examples 15–16 and Comparative Examples 17–18
Propylene Homopolymerizations

These examples were run with the polypropylene catalyst, PTK-4320 (a $TiCl_4$ supported on $MgCl_2$ type catalyst, available from Engelhard Corporation). PTK-4320 is dispersed on silica to distribute the catalyst and obtain good particle morphology and high activity. The polymerization process of Example 5 was generally followed for all the examples except that for Comparative Examples 17–18, none of the triethylaluminum solution was premixed with the catalyst and the entire 2.0 mL of a 25 percent by weight solution of triethylaluminum in heptane was added directly to the reactor. The organosilane modifier was varied in Example 16 and in Comparative Example 18. The results are listed in Table 2. These examples show that the improvement in activity is also seen with catalysts that have been dispersed on inert materials.

TABLE 2

Proylene Polymerizations

| EXAMPLE | Organosilane Modifier | Activity |
|---|---|---|
| 15 | cyclohexylmethyldimethoxysilane | 19,700 |
| 16 | dicyclopentyldimethoxysilane | 20,800 |
| Comparative 17 | cyclohexylmethyldimethoxysilane | 15,600 |
| Comparative 18 | dicyclopentyldimethoxysilane | 16,100 |

The preceding examples are meant only as illustrations. The following claims define the invention.

We claim:

1. A process which comprises:
   (a) charging a reactor with propylene and from about 90 to 99% by weight of the amount to be used of an organoaluminum cocatalyst;
   (b) heating the propylene/cocatalyst mixture to at least about 50° C.;
   (c) premixing the remaining 1 to 10% by weight of the organoaluminum cocatalyst with a magnesium halide-supported Ziegler-Natta catalyst and adding this premix to the reactor; and
   (d) maintaining the reaction mixture at a temperature of at least about 50° C. to produce a propylene polymer.

2. The process of claim 1 wherein step (d) is performed in the presence of an olefin comonomer.

3. The process of claim 2 wherein the olefin comonomer is ethylene.

4. The process of claim 1 wherein the Ziegler-Natta catalyst incorporates a Group 4–6 transition metal.

5. The process of claim 4 wherein the transition metal is selected from the group consisting of titanium, vanadium, and chromium.

6. The process of claim 5 wherein the transition metal is titanium and the magnesium halide is magnesium chloride.

7. The process of claim 1 wherein the organoaluminum cocatalyst is a trialkyl aluminum compound.

8. The process of claim 1 further comprising adding hydrogen to the reaction mixture.

9. The process of claim 1 further comprising adding an organosilane modifier to the reaction mixture.

10. The process of claim 9 wherein the organosilane modifier has the general structure $R_ySi(OR)_{4-y}$ where y is an integer from 1 to 3 and each R is independently $C_1$–$C_{30}$ hydrocarbyl.

11. The process of claim 10 wherein y is 2.

12. The process of claim 1 wherein the polymerization is performed at a temperature within the range of about 60° C. to about 90° C.

13. The process of claim 1 wherein the premixing of the remaining 1 to 10% of the organoaluminum cocatalyst with a magnesium halide-supported Ziegler-Natta catalyst is done below about 40° C.

14. The process of claim 13 wherein the premixing is done at a temperature of from about –20° C. to about 20° C.

15. A continuous polymerization process of claim 1.

16. The process of claim 15 wherein the premixing is done in a continuous manner by adding a stream of the organoaluminum cocatalyst to the feed of the magnesium halide-supported Ziegler-Natta catalyst prior to the feed entering the reactor.

17. A bulk polymerization process of claim 1.

18. A slurry polymerization process of claim 1.

* * * * *